United States Patent
Zhu et al.

(10) Patent No.: US 12,446,062 B2
(45) Date of Patent: Oct. 14, 2025

(54) METHOD AND BASE STATION FOR RESOURCE ALLOCATION

(71) Applicant: Telefonaktiebolaget LM Ericsson (publ), Stockholm (SE)

(72) Inventors: Huaisong Zhu, Beijing (CN); Yi Wang, Beijing (CN); Zhi Ge, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 394 days.

(21) Appl. No.: 17/927,013

(22) PCT Filed: May 29, 2020

(86) PCT No.: PCT/CN2020/093429
§ 371 (c)(1),
(2) Date: Nov. 22, 2022

(87) PCT Pub. No.: WO2021/237709
PCT Pub. Date: Dec. 2, 2021

(65) Prior Publication Data
US 2023/0247663 A1    Aug. 3, 2023

(51) Int. Cl.
*H04W 72/542* (2023.01)
*H04L 5/00* (2006.01)

(52) U.S. Cl.
CPC ......... *H04W 72/542* (2023.01); *H04L 5/0044* (2013.01); *H04L 5/006* (2013.01)

(58) Field of Classification Search
CPC .. H04W 72/542; H04W 76/15; H04L 5/0044; H04L 5/006; H04L 5/0007; H04L 27/2601; H04L 1/1614; H04L 1/0026
See application file for complete search history.

(56) References Cited

U.S. PATENT DOCUMENTS

| | | | |
|---|---|---|---|
| 11,445,519 B1 * | 9/2022 | Pawar | H04W 76/15 |
| 2012/0155408 A1 * | 6/2012 | Pedersen | H04L 1/0026 370/329 |

(Continued)

FOREIGN PATENT DOCUMENTS

| | | |
|---|---|---|
| CN | 102387587 A | 3/2012 |
| CN | 103841651 A | 6/2014 |

(Continued)

OTHER PUBLICATIONS

Chiumento, S. Pollin, C. Desset, L. Van der Perre and R. Lauwereins, "Exploiting transport-block constraints in LTE improves downlink performance," 2014 IEEE Wireless Communications and Networking Conference (WCNC), Istanbul, Turkey, 2014, pp. 1398-1402, doi: 10.1109/WCNC.2014.6952394 (Year: 2014).*

(Continued)

*Primary Examiner* — Ayaz R Sheikh
*Assistant Examiner* — Louis Samara
(74) *Attorney, Agent, or Firm* — Murphy, Bilak & Homiller, PLLC

(57) ABSTRACT

A method and a base station for resource allocation are disclosed. According to an embodiment, the base station determines a number of physical resource blocks (PRBs) consumed by a code block. The base station allocates a first set of PRBs for a transmission for a terminal device, based on channel qualities of a second set of PRBs which have a quantity equaling to the determined number and have the worst channel qualities among the first set of PRBs.

10 Claims, 10 Drawing Sheets

Determine a number of PRBs consumed by a code block — 402

Allocate a first set of PRBs for a transmission for a terminal device, based on channel qualities of a second set of PRBs which have a quantity equaling to the determined number and have the worst channel qualities among the first set of PRBs — 404

(56) References Cited

U.S. PATENT DOCUMENTS

| | | | | |
|---|---|---|---|---|
| 2015/0382355 A1* | 12/2015 | Huang | ................ | H04W 72/542 |
| | | | | 370/329 |
| 2017/0201348 A1* | 7/2017 | Jang | .......................... | H04L 1/08 |
| 2020/0052832 A1* | 2/2020 | Tian | ....................... | H04L 1/1614 |
| 2025/0024504 A1* | 1/2025 | Pan | ..................... | H04L 27/2601 |

FOREIGN PATENT DOCUMENTS

| | | | | | |
|---|---|---|---|---|---|
| CN | 103401670 | B | | 4/2016 | |
| CN | 107294570 | A | * 10/2017 | ........... | H04B 7/0417 |
| CN | 107276732 | B | * 11/2019 | ........... | H04W 72/54 |
| CN | 111565409 | A | * 8/2020 | ........... | H04B 17/309 |
| JP | 2016521934 | A | * 7/2016 | ........... | H04L 1/0009 |
| WO | WO-2009106607 | A1 | * 9/2009 | ........... | H04L 5/0007 |
| WO | 2016122386 | A2 | 8/2016 | | |
| WO | WO-2016206888 | A1 | * 12/2016 | ........... | H04L 1/0026 |
| WO | 2019215526 | A1 | 11/2019 | | |

OTHER PUBLICATIONS

Qualcomm Incorporated, "Increased PUSCH spectral efficiency", 3GPP TSG-RAN WG1 #91, R1-1720420, Reno, USA, Nov. 27-Dec. 1, 2017, 1-5.

* cited by examiner

METHOD AND BASE STATION FOR RESOURCE ALLOCATION

TECHNICAL FIELD

Embodiments of the disclosure generally relate to communication, and, more particularly, to a method and a base station for resource allocation.

BACKGROUND

This section introduces aspects that may facilitate better understanding of the present disclosure. Accordingly, the statements of this section are to be read in this light and are not to be understood as admissions about what is in the prior art or what is not in the prior art.

One fundamental challenge to orthogonal frequency division multiplexing (OFDM) wireless transmission is the channel quality varying across the frequency range used for the transmission. Even if the radio channel is flat, the quality variations across the frequency range may occur due to imperfections in radio frequency (RF) components. Thus, some frequency resource may suffer much worse quality than others, possibly resulting in the overall transport block failing to decode despite almost all bits being correctly decoded.

To conquer this selective fading or selective interfering, interleaving is introduced at channel coding function, which spreads systematic bits across the modulation symbols. The result of the interleaving is a quality-averaging effect across the modulation symbols, resulting in a higher likelihood of correctly decoding very large code block.

New radio (NR) utilizes low-density parity-check (LDPC) for channel coding. The LDPC coder in NR is defined to support up to a certain size (max 8424 bits for base graph 1 and max 3840 bits for base graph 2). This restriction can reduce the coder/decoder design complexity. On the other hand, to handle transport block sizes much larger than this limitation (e.g. more than 400,000 bits), NR defines a concept called "code block", which means a large transport block will be divided or segmented into multiple equal-sized blocks, i.e. code blocks.

As shown in FIG. 1, each code block will be separately processed with cyclic redundancy check (CRC) attachment, LDPC encoding, rate matching and bit inter-leaver. This kind of interleaving design in NR is to guarantee receiver processing latency and reduce memory requirement.

Since interleaving and LDPC coding is executed at code block level, the receiver only needs to buffer the modulation symbols of one code block, then it can decode this code block instead of modulation symbols of the whole transport block. This is quite important for reducing processing latency.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for resource allocation. In particular, one of the problems to be solved by the disclosure is to efficiently handle the scenario of mixture of physical resource blocks (PRBs) with high and low channel qualities.

According to a first aspect of the disclosure, there is provided a method performed by a base station. The method may comprise determining a number of PRBs consumed by a code block. The method may further comprise allocating a first set of PRBs for a transmission for a terminal device, based on channel qualities of a second set of PRBs which have a quantity equaling to the determined number and have the worst channel qualities among the first set of PRBs.

In this way, the resource allocation can be made matching accurately to the actual channel condition in the scenario of mixture of PRBs with high and low channel qualities.

In an embodiment of the disclosure, the number of PRBs consumed by a code block may be determined as a size of one code block divided by an average throughput of the terminal device per PRB per symbol.

In an embodiment of the disclosure, the average throughput of the terminal device per PRB per symbol may be derived from previous transmission for the terminal device.

In an embodiment of the disclosure, allocating the first set of PRBs for the transmission for the terminal device may comprise determining, from available PRBs for resource allocation, a first subset of PRBs. Allocating the first set of PRBs for the transmission for the terminal device may further comprise determining, from the first subset of PRBs, a second subset of PRBs which have a quantity equaling to the determined number and have the worst channel qualities among the first subset of PRBs. Allocating the first set of PRBs for the transmission for the terminal device may further comprise determining a total capacity of the first subset of PRBs based on channel qualities of the second subset of PRBs. Allocating the first set of PRBs for the transmission for the terminal device may further comprise determining the first set of PRBs based on the total capacity of the first subset of PRBs and a quantity of data expected by the terminal device for the transmission.

In an embodiment of the disclosure, the total capacity of the first subset of PRBs may be determined as a number of the PRBs in the first subset multiplied by an average of capacities corresponding to the channel qualities of the second subset of PRBs.

In an embodiment of the disclosure, allocating the first set of PRBs for the transmission for the terminal device may further comprise sorting the available PRBs according to channel qualities of the available PRBs. The available PRB with better channel quality may be preferentially determined as a member of the first subset of PRBs.

In an embodiment of the disclosure, when the total capacity of the first subset of PRBs is greater than or equal to the quantity of data, the first subset of PRBs may be determined as the first set of PRBs.

In an embodiment of the disclosure, when the total capacities of all the first subsets of the available PRBs are smaller than the quantity of data, the first subset of PRBs having the greatest total capacity may be determined as the first set of PRBs.

In an embodiment of the disclosure, the transmission for the terminal device may be a downlink transmission to the terminal device or an uplink transmission from the terminal device.

In an embodiment of the disclosure, the channel quality may be represented by signal to interference plus noise ratio (SINR).

According to a second aspect of the disclosure, there is provided a base station. The base station may comprise at least one processor and at least one memory. The at least one memory may contain instructions executable by the at least one processor, whereby the base station may be operative to determine a number of PRBs consumed by a code block. The base station may be further operative to allocate a first set of PRBs for a transmission for a terminal device, based on channel qualities of a second set of PRBs which have a quantity equaling to the determined number and have the worst channel qualities among the first set of PRBs.

In an embodiment of the disclosure, the base station may be operative to determine the number of PRBs consumed by a code block as a size of one code block divided by an average throughput of the terminal device per PRB per symbol.

In an embodiment of the disclosure, the average throughput of the terminal device per PRB per symbol may be derived from previous transmission for the terminal device.

In an embodiment of the disclosure, the base station may be operative to allocate the first set of PRBs for the transmission for the terminal device by determining, from available PRBs for resource allocation, a first subset of PRBs. The base station may be operative to allocate the first set of PRBs for the transmission for the terminal device by determining, from the first subset of PRBs, a second subset of PRBs which have a quantity equaling to the determined number and have the worst channel qualities among the first subset of PRBs. The base station may be operative to allocate the first set of PRBs for the transmission for the terminal device by determining a total capacity of the first subset of PRBs based on channel qualities of the second subset of PRBs. The base station may be operative to allocate the first set of PRBs for the transmission for the terminal device by determining the first set of PRBs based on the total capacity of the first subset of PRBs and a quantity of data expected by the terminal device for the transmission.

In an embodiment of the disclosure, the base station may be operative to determine the total capacity of the first subset of PRBs as a number of the PRBs in the first subset multiplied by an average of capacities corresponding to the channel qualities of the second subset of PRBs.

In an embodiment of the disclosure, the base station may be operative to allocate the first set of PRBs for the transmission for the terminal device by sorting the available PRBs according to channel qualities of the available PRBs. The available PRB with better channel quality may be preferentially determined as a member of the first subset of PRBs.

In an embodiment of the disclosure, the base station may be operative to, when the total capacity of the first subset of PRBs is greater than or equal to the quantity of data, determine the first subset of PRBs as the first set of PRBs.

In an embodiment of the disclosure, the base station may be operative to, when the total capacities of all the first subsets of the available PRBs are smaller than the quantity of data, determine, as the first set of PRBs, the first subset having the greatest total capacity.

In an embodiment of the disclosure, the transmission for the terminal device may be a downlink transmission to the terminal device or an uplink transmission from the terminal device.

In an embodiment of the disclosure, the channel quality may be represented by SINR.

According to a third aspect of the disclosure, there is provided a computer program product. The computer program product may comprise instructions which when executed by at least one processor, cause the at least one processor to perform the method according to the above first aspect.

According to a fourth aspect of the disclosure, there is provided a computer readable storage medium. The computer readable storage medium may comprise instructions which when executed by at least one processor, cause the at least one processor to perform the method according to the above first aspect.

According to a fifth aspect of the disclosure, there is provided a base station. The base station may comprise a determination module for determining a number of PRBs consumed by a code block. The base station may further comprise an allocation module for allocating a first set of PRBs for a transmission for a terminal device, based on channel qualities of a second set of PRBs which have a quantity equaling to the determined number and have the worst channel qualities among the first set of PRBs.

BRIEF DESCRIPTION OF THE DRAWINGS

These and other objects, features and advantages of the disclosure will become apparent from the following detailed description of illustrative embodiments thereof, which are to be read in connection with the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

As mentioned above, in the case of a large transport block, that is, at very high data rate, the user data are split into multiple code blocks. The coded data is interleaved only at code block level. This is beneficial from an overall latency perspective since it allows both the transmitter and receiver to process the data "on the fly". However, it would result in each code block occupying only a small number of contiguous PRBs.

Figure 1:
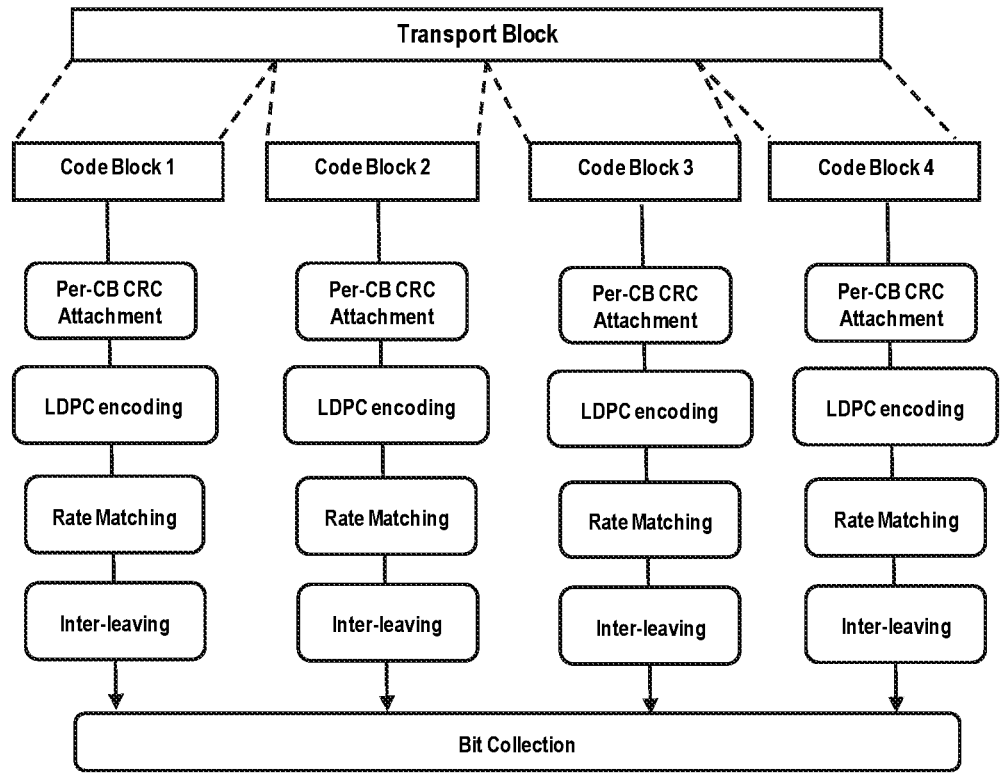
FIG. 1 is a diagram illustrating the processing performed on code blocks.
Figure 2A:
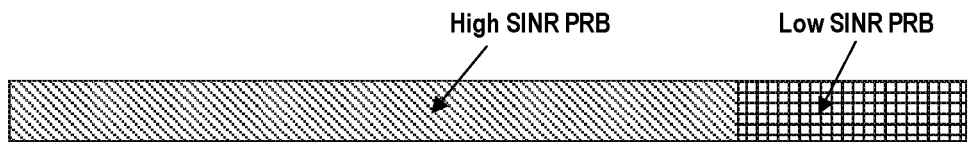
FIGS. 2A-2B are diagrams illustrating two scenarios of resource allocation.
Figure 2B:
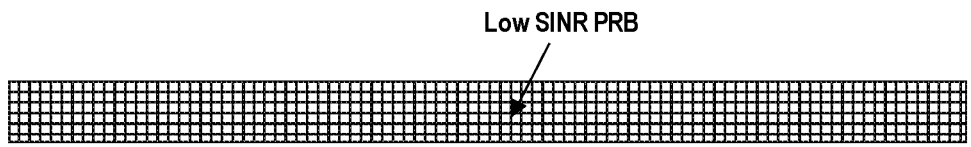

Hence, if the channel quality varies across the frequency range used for transmission, some code blocks may suffer worse quality than other code blocks, possibly resulting in the overall transport block failing to decode despite almost all code blocks being correctly decoded. This means in high SINR PRB and low SINR PRB mixture allocation, the channel capacity of high SINR PRB will be wasted to guarantee block error rate of the whole transport block, resulting in that the throughput corresponding to the resource allocation shown in FIG. 2A will be approximately the same as the throughput corresponding to the resource allocation shown in FIG. 2B:

Throughput (High SINR PRB+Low SINR PRB)≈Throughput (Low SINR PRB).

Figure 3:
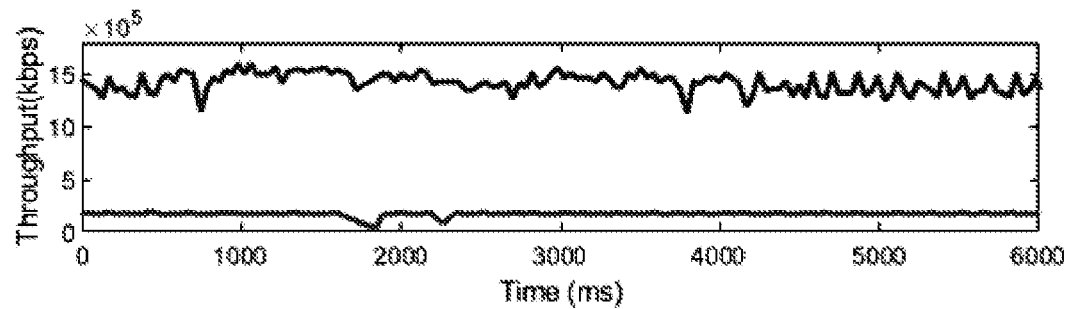
FIG. 3 is a diagram illustrating the test result for a terminal device.

FIG. 3 illustrates a test result in lab with a commercial UE. As shown, when testing full buffer downloading for this single UE under the condition of 100 MHz traffic bandwidth of NR without interference, the throughput reached around 1.5 Gbps. After 20 MHz interference was added, the throughput degraded to only 200 Mbps. It implies 20% of PRB interfered will cause 85% throughput degradation, since the code block located in the interfered PRB will always fails. To guarantee transport block success rate (or transmission latency), the next generation node B (gNB) has to lower down the coding rate of the whole transport block to an extremely low level. This process of lowering down the coding rate by outer loop adaptation (using acknowledgment/non-acknowledgement (ACK/NACK) feedback to adjust estimated channel quality step by step) may consume a certain period of time.

In addition, NR provides an alternative solution to handle this high and low SINR mixture scenario, i.e. interleaving resource allocation mode. This mode will allocate resourceblocks which could be distributed in the frequency domain and widely separated. In some degree, it can reduce the limitation of code block level interleaving. Unfortunately, this is an optional feature, many user equipments (UEs) do not support this function and cannot be widely used in live network.

The present disclosure proposes an improved solution for resource allocation. The basic idea is to consider the block error rate (BLER) impact of the worst code block when allocating physical resources. Even if the base station (e.g. gNB) schedules a UE which does not support interleave resource allocation feature but have a large transport block, the high-low SNR PRB mixture scenario can be handled efficiently.

The solution of the present disclosure may be applied to a communication system including a terminal device and a base station. The terminal device can communicate through a radio access communication link with the base station. The base station can provide radio access communication links to terminal devices that are within its communication service cell. Note that the communications may be performed between the terminal device and the base station according to any suitable communication standards and protocols.

The term "base station (BS)" may refer to, for example, a node B (NodeB or NB), an evolved Node B (eNodeB or eNB), a next generation Node B (gNodeB or gNB), a remote radio unit (RRU), a radio header (RH), a remote radio head (RRH), a relay, a low power node such as a femto, a pico, and so forth. For example, a base station may comprise a central unit (CU) including CU user plane (UP) and CU control plane (CP) and one or more distributed units (DUs). The CU and DU(s) may co-locate in a same network node, e.g. a same base station.

The terminal device may also be referred to as, for example, device, access terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3rd generation partnership project (3GPP) context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Figure 4:
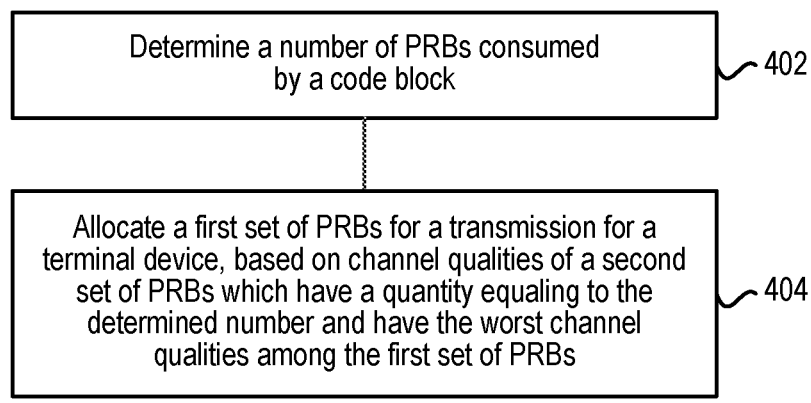
FIG. 4 is a flowchart illustrating a method performed by a base station according to an embodiment of the disclosure.

Hereinafter, the solution of the present disclosure will be described in detail with reference to FIGS. 4-14. FIG. 4 is a flowchart illustrating a method performed by a base station according to an embodiment of the disclosure. The method may be performed when the base station allocates physical resources for a transmission for a terminal device. The transmission for the terminal device may be a downlink transmission to the terminal device or an uplink transmission from the terminal device. At block 402, the base station determines a number of PRBs consumed by a code block. For example, the number of PRBs consumed by a code block may be determined as a size of one code block divided by an average throughput of the terminal device per PRB per symbol. The symbol may be an OFDM symbol. The average throughput of the terminal device per PRB per symbol may be derived from the previous transmission for the terminal device.

At block 404, the base station allocates a first set of PRBs for the transmission for the terminal device, based on channel qualities of a second set of PRBs which have a quantity equaling to the determined number and have the worst channel qualities among the first set of PRBs. For example, the channel quality may be represented by SINR or any other suitable metric. Since the channel qualities of the second set of PRBs are considered for resource allocation, the resource allocation can be made matching accurately to the actual channel condition in the scenario of mixture of PRBs with high and low channel qualities.

Figure 5:
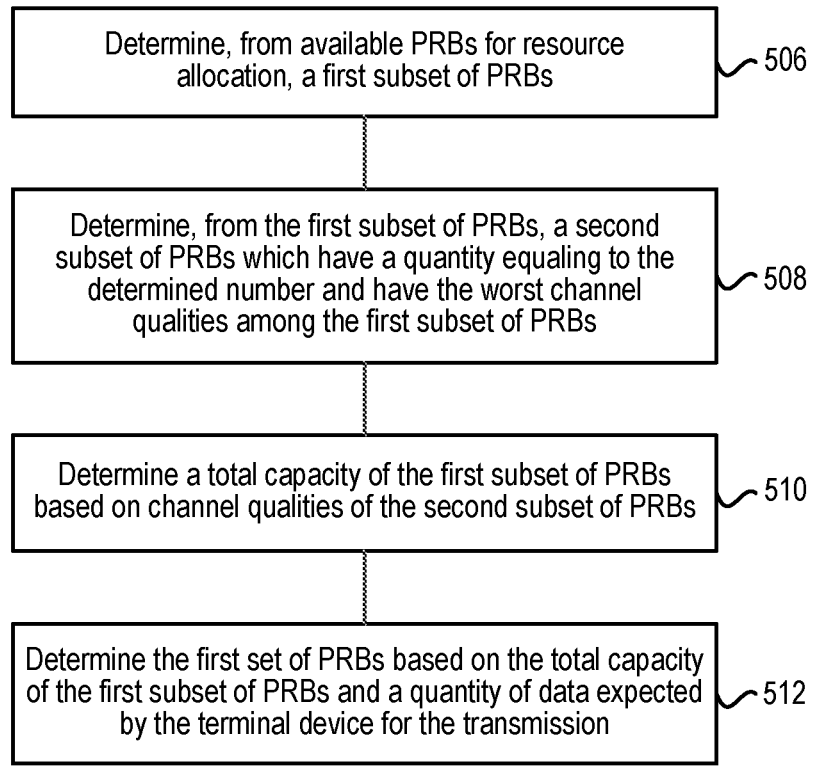
FIG. 5 is a flowchart for explaining the method of FIG. 4.

For example, block 404 may be implemented as including at least blocks 506-512 of FIG. 5. At block 506, the base station determines, from available PRBs for resource allocation, a first subset of PRBs. The first subset of PRBs may be the whole available PRBs for resource allocation. At block 508, the base station determines, from the first subset of PRBs, a second subset of PRBs which have a quantity equaling to the determined number and have the worst channel qualities among the first subset of PRBs. Since the second subset of PRBs have the worst channel qualities among the first subset of PRBs, the number of the PRBs in the first subset is greater than the determined number. This means the first subset of PRBs may refer to any one of those subsets of the available PRBs whose number of members is greater than the determined number.

At block 510, the base station determines a total capacity of the first subset of PRBs based on channel qualities of the second subset of PRBs. For example, the total capacity of the first subset of PRBs may be determined as a number of the PRBs in the first subset multiplied by an average of capacities corresponding to the channel qualities of the second subset of PRBs. Thus, the average channel quality of the second subset of PRBs is taken as the channel quality of every PRB in the first subset of PRBs. The correspondence between the capacities of PRBs and the channel qualities of the PRBs may be predetermined (e.g. as a lookup table) based on simulations and/or experiments.

At block 512, the base station determines the first set of PRBs based on the total capacity of the first subset of PRBs and a quantity of data expected by the terminal device for the transmission. For example, if the total capacity of the first subset of PRBs is greater than or equal to the quantity of data, the first subset of PRBs may be determined as the first set of PRBs. On the other hand, if the total capacities of all the first subsets of the available PRBs are smaller than the quantity of data, the first subset of PRBs having the greatest total capacity are determined as the first set of PRBs.

Figure 6:
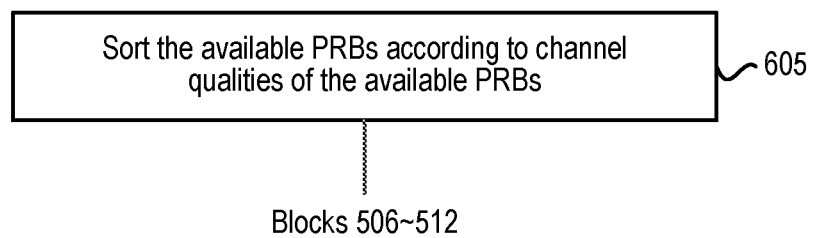
FIG. 6 is a flowchart for explaining the method of FIG. 4.

As another option, block 404 may be implemented as including blocks 506-512 of FIG. 5 and block 605 of FIG. 6. At block 605, the base station sorts the available PRBs according to channel qualities of the available PRBs. In this case, the available PRB with better channel quality may be preferentially determined as a member of the first subset of PRBs at block 506.

For ease of understanding, a typical legacy scheduling method and an exemplary scheduling method according to an embodiment will be described below. In the typical legacy scheduling method, at step 1, the available PRBs are sorted in an order of SINR from high to low, according to the measurement from the base station (e.g. gNB) or UE CSI report. Suppose the sorted available PRB indexes are numbered as PRB0, PRB1, PRB2, PRB(N−1) and their related capacities are calculated as: {C(0), C(1), . . . C(N−1)}, where C(0)>=C(1)>=C(2), . . . >=C(N−1).

At step 2, the UE buffer status is checked to see how to allocate physical resources. This can be represented as below:

```
For i = 0 to N-1
    if Σ_{j=0}^{j=i} C (j) ≥ user data requirement
        allocated sub-band number = i;
        break;
    end
end
Physical resource allocation will be: 0, 1, ... i.
```

In contrast, in the exemplary scheduling method according to an embodiment, a subband size K (i.e. one code block will consume at least K PRBs) is estimated. When allocating PRBs for one transmission, the base station (e.g. gNB) will set the allocated PRBs' SINR as the worst K PRBs' SINR. While in the legacy design, the allocated PRBs' SINR is set as the average of the allocated PRBs' SINR. By considering the code block on the worst SINR subband, the base station (e.g. a scheduler) can select the PRB resources with the max total capacity and may skip some PRBs which have extreme low SINR than others.

For instance, at step 1 of the exemplary scheduling method, a new concept called 'code_block_resource_size' which present how many physical resources that one code block will consume is introduced. The base station may estimate the code_block_resource_size by:

code_block_resource_size=code block size/UE average throughput per PRB per symbol.

The length of a code block is defined by the 3GPP 38.212, i.e. 8424 bits for base graph 1 and 3840 bits for base graph 2. The UE average throughput per PRB per symbol is the expectation of UE throughput per PRB and per OFDM symbol, which can be derived from the previous transmission.

At step 2, the available PRBs are sorted in an order of SINR from high to low, according to the measurement from the base station or UE CSI report. Suppose the sorted available PRB indexes are numbered as PRB0, PRB1, PRB2, . . . , PRB(N−1) and their related capacities are calculated as: {C(0), C(1), . . . C(N−1)}, where C(0)>=C(1)>=C(2), . . . >=C(N−1).

At step 3, capacities of different PRB allocation choices are calculated and the UE buffer status is checked to see how to allocate physical resources. This may be represented as below:

```
K = code_block_resource_size;
    For i = 0 to N-1
        // Select K PRBs with the lowest SINR and get an average capacity of these K PRBs.
        C_K_average = average {C(i-K-1), C(i-K-2), ..., C(i)};
        // Force all PRB capacities to be the same as the worst K PRBs.
        Set C_temp(0) to C_temp(i) = C_K_average
            if Σ_{j=0}^{j=i} C_temp (j) ≥ user data requirement
                allocated PRB number is from 0 to i;
                break;
            endif
        // Remember the capacities ever reached for each PRB allocation choice.
            Total_capacity (i) = Σ_{j=0}^{j=i} C_temp (j)
    end for
    // if available PRBs cannot fulfill UE requirement,
    // gNB should select subband who provide max capacity.
    If i == N-1
        Find max value from Total_capacity,
            i.e. Total_capacity(j0) > Total_capacity(j), j0, j = 0 to N-1
        allocate PRB from 0 to j0;
    endif
```

Note that when $i<=k-1$, an average of the capacities of these (i+1) PRBs is calculated. In summary, the base station (e.g. a scheduler) estimates the capacity of different PRB allocation choice, based on worst code-block-size PRB SINR instead of those PRBs with high SINR. As a result, compared with the legacy scheduling method, in the exemplary scheduling method, if some PRBs are seriously interfered and the corresponding SINR is much lower than other PRBs, only fraction of the PRBs will be scheduled and error bits are almost even distributed among code blocks.

Figure 7:
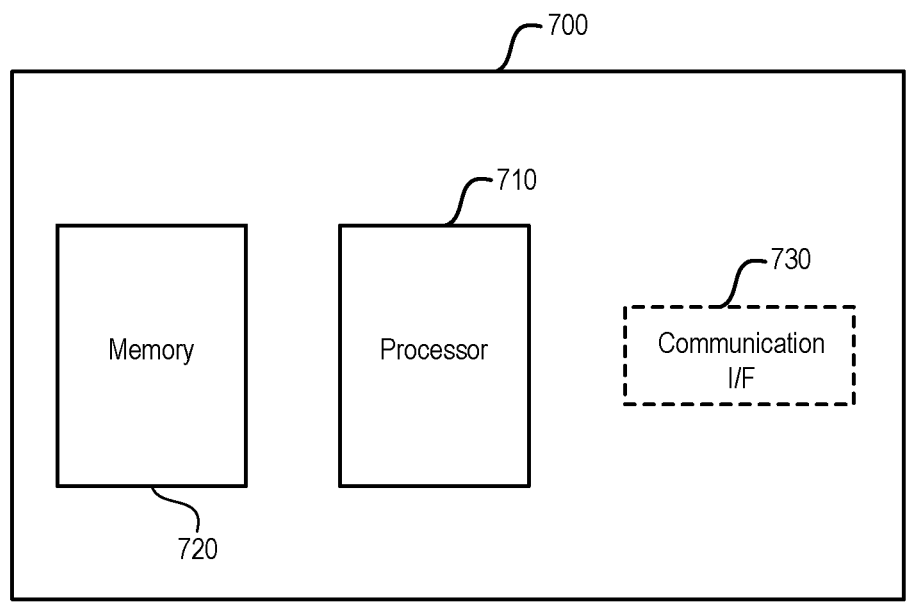
FIG. 7 is a block diagram showing an apparatus suitable for use in practicing some embodiments of the disclosure.

FIG. 7 is a block diagram showing an apparatus suitable for use in practicing some embodiments of the disclosure. For example, the base station described above may be implemented through the apparatus 700. As shown, the apparatus 700 may include a processor 710, a memory 720 that stores a program, and optionally a communication interface 730 for communicating data with other external devices through wired and/or wireless communication.

The program includes program instructions that, when executed by the processor 710, enable the apparatus 700 to operate in accordance with the embodiments of the present disclosure, as discussed above. That is, the embodiments of the present disclosure may be implemented at least in part by computer software executable by the processor 710, or by hardware, or by a combination of software and hardware.

The memory 720 may be of any type suitable to the local technical environment and may be implemented using any suitable data storage technology, such as semiconductor based memory devices, flash memories, magnetic memory devices and systems, optical memory devices and systems, fixed memories and removable memories. The processor 710 may be of any type suitable to the local technical environment, and may include one or more of general purpose computers, special purpose computers, microprocessors, digital signal processors (DSPs) and processors based on multi-core processor architectures, as non-limiting examples.

Figure 8:
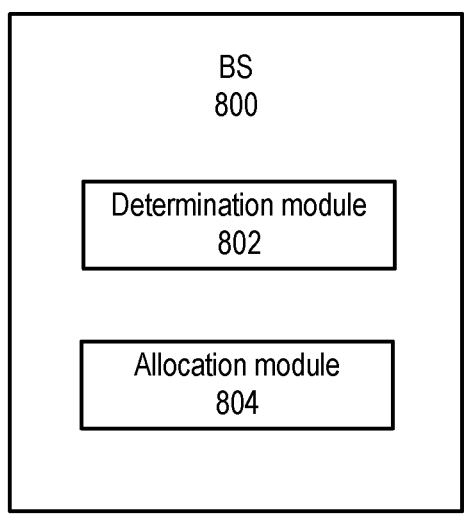
FIG. 8 is a block diagram showing a base station according to an embodiment of the disclosure.

FIG. 8 is a block diagram showing a base station according to an embodiment of the disclosure. As shown, the base station 800 comprises a determination module 802 and an allocation module 804. The determination module 802 may be configured to determine a number of PRBs consumed by a code block, as described above with respect to block 402. The allocation module 804 may be configured to allocate a first set of PRBs for a transmission for a terminal device, based on channel qualities of a second set of PRBs which have a quantity equaling to the determined number and have the worst channel qualities among the first set of PRBs, as described above with respect to block 404. The modules described above may be implemented by hardware, or software, or a combination of both.

Figure 9:
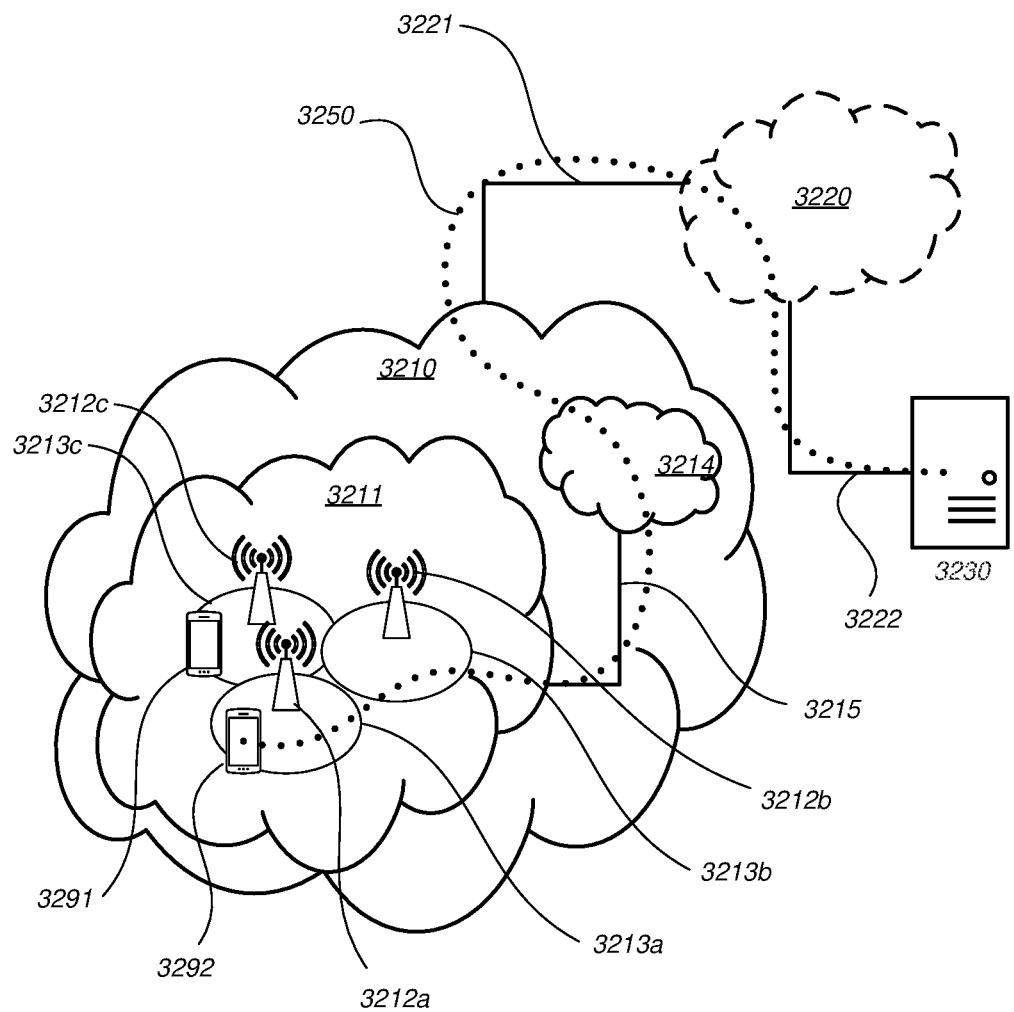
FIG. 9 is a diagram showing a telecommunication network connected via an intermediate network to a host computer in accordance with some embodiments.

With reference to FIG. 9, in accordance with an embodiment, a communication system includes telecommunication network 3210, such as a 3GPP-type cellular network, which comprises access network 3211, such as a radio access network, and core network 3214. Access network 3211 comprises a plurality of base stations 3212a, 3212b, 3212c, such as NBs, eNBs, gNBs or other types of wireless access points, each defining a corresponding coverage area 3213a, 3213b, 3213c. Each base station 3212a, 3212b, 3212c is connectable to core network 3214 over a wired or wireless connection 3215. A first UE 3291 located in coverage area 3213c is configured to wirelessly connect to, or be paged by, the corresponding base station 3212c. A second UE 3292 in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

Telecommunication network 3210 is itself connected to host computer 3230, which may be embodied in the hardware and/or software of a standalone server, a cloud-implemented server, a distributed server or as processing resources in a server farm. Host computer 3230 may be under the ownership or control of a service provider, or may be operated by the service provider or on behalf of the service provider. Connections 3221 and 3222 between telecommunication network 3210 and host computer 3230 may extend directly from core network 3214 to host computer 3230 or may go via an optional intermediate network 3220. Intermediate network 3220 may be one of, or a combination of more than one of, a public, private or hosted network; intermediate network 3220, if any, may be a backbone network or the Internet; in particular, intermediate network 3220 may comprise two or more sub-networks (not shown).

The communication system of FIG. 9 as a whole enables connectivity between the connected UEs 3291, 3292 and host computer 3230. The connectivity may be described as an over-the-top (OTT) connection 3250. Host computer 3230 and the connected UEs 3291, 3292 are configured to communicate data and/or signaling via OTT connection 3250, using access network 3211, core network 3214, any intermediate network 3220 and possible further infrastructure (not shown) as intermediaries. OTT connection 3250 may be transparent in the sense that the participating communication devices through which OTT connection 3250 passes are unaware of routing of uplink and downlink communications. For example, base station 3212 may not or need not be informed about the past routing of an incoming downlink communication with data originating from host computer 3230 to be forwarded (e.g., handed over) to a connected UE 3291. Similarly, base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 10. In communication system 3300, host computer 3310 comprises hardware 3315 including communication interface 3316 configured to set up and maintain a wired or wireless connection with an interface of a different communication device of communication system 3300. Host computer 3310 further comprises processing circuitry 3318, which may have storage and/or processing capabilities. In particular, processing circuitry 3318 may comprise one or more programmable processors, application-specific integrated circuits, field programmable gate arrays or combinations of these (not shown) adapted to execute instructions. Host computer 3310 further comprises software 3311, which is stored in or accessible by host computer 3310 and executable by processing circuitry 3318. Software 3311 includes host application 3312. Host application 3312 may be operable to provide a service to a remote user, such as UE 3330 connecting via OTT connection 3350 terminating at UE 3330 and host computer 3310. In providing the service to the remote user, host application 3312 may provide user data which is transmitted using OTT connection 3350.

Communication system 3300 further includes base station 3320 provided in a telecommunication system and comprising hardware 3325 enabling it to communicate with host computer 3310 and with UE 3330. Hardware 3325 may include communication interface 3326 for setting up and maintaining a wired or wireless connection with an interface of a different communication device of communication system 3300, as well as radio interface 3327 for setting up and maintaining at least wireless connection 3370 with UE 3330 located in a coverage area (not shown in FIG. 10) served by base station 3320. Communication interface 3326 may be configured to facilitate connection 3360 to host computer 3310. Connection 3360 may be direct or it may pass through a core network (not shown in FIG. 10) of the telecommunication system and/or through one or more intermediate networks outside the telecommunication system. In the embodiment shown, hardware 3325 of base station 3320 further includes processing circuitry 3328, which may comprise one or more programmable processors, application-specific integrated circuits, field programmable gate arrays or combinations of these (not shown) adapted to execute instructions. Base station 3320 further has software 3321 stored internally or accessible via an external connection.

Communication system 3300 further includes UE 3330 already referred to. Its hardware 3335 may include radio interface 3337 configured to set up and maintain wireless connection 3370 with a base station serving a coverage area in which UE 3330 is currently located. Hardware 3335 of UE 3330 further includes processing circuitry 3338, which may comprise one or more programmable processors, application-specific integrated circuits, field programmable gate arrays or combinations of these (not shown) adapted to execute instructions. UE 3330 further comprises software 3331, which is stored in or accessible by UE 3330 and executable by processing circuitry 3338. Software 3331 includes client application 3332. Client application 3332 may be operable to provide a service to a human or non-human user via UE 3330, with the support of host computer 3310. In host computer 3310, an executing host application 3312 may communicate with the executing client application 3332 via OTT connection 3350 terminating at UE 3330 and host computer 3310. In providing the service to the user, client application 3332 may receive request data from host application 3312 and provide user data in response to the request data. OTT connection 3350 may transfer both the request data and the user data. Client application 3332 may interact with the user to generate the user data that it provides.

Figure 10:
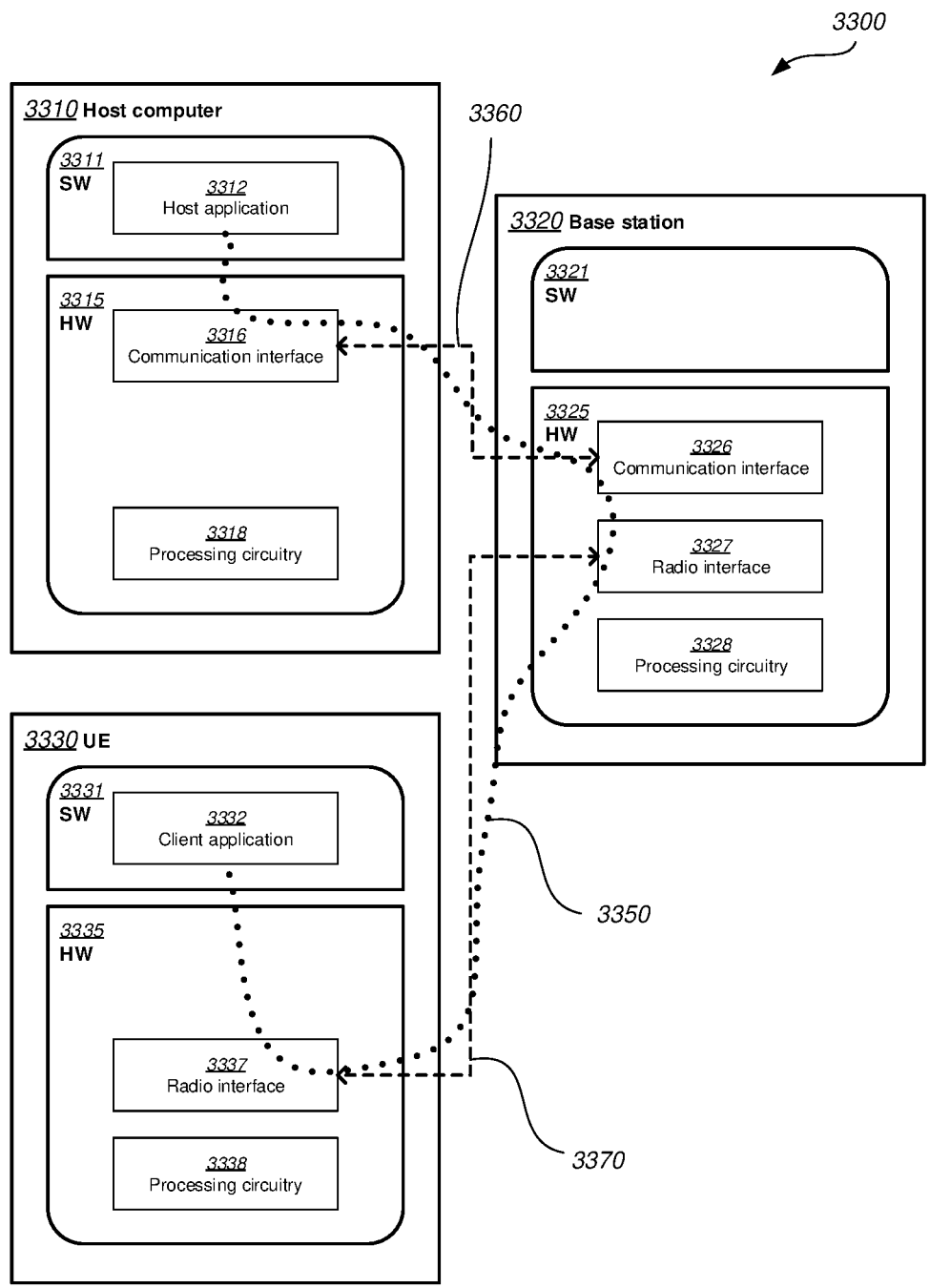
FIG. 10 is a diagram showing a host computer communicating via a base station with a user equipment in accordance with some embodiments.

It is noted that host computer 3310, base station 3320 and UE 3330 illustrated in FIG. 10 may be similar or identical to host computer 3230, one of base stations 3212a, 3212b, 3212c and one of UEs 3291, 3292 of FIG. 9, respectively. This is to say, the inner workings of these entities may be as shown in FIG. 10 and independently, the surrounding network topology may be that of FIG. 9.

In FIG. 10, OTT connection 3350 has been drawn abstractly to illustrate the communication between host computer 3310 and UE 3330 via base station 3320, without explicit reference to any intermediary devices and the precise routing of messages via these devices. Network infrastructure may determine the routing, which it may be configured to hide from UE 3330 or from the service provider operating host computer 3310, or both. While OTT connection 3350 is active, the network infrastructure may further take decisions by which it dynamically changes the routing (e.g., on the basis of load balancing consideration or reconfiguration of the network).

Wireless connection 3370 between UE 3330 and base station 3320 is in accordance with the teachings of the embodiments described throughout this disclosure. One or more of the various embodiments improve the performance of OTT services provided to UE 3330 using OTT connection 3350, in which wireless connection 3370 forms the last segment. More precisely, the teachings of these embodiments may improve the latency and thereby provide benefits such as reduced user waiting time.

A measurement procedure may be provided for the purpose of monitoring data rate, latency and other factors on which the one or more embodiments improve. There may further be an optional network functionality for reconfiguring OTT connection 3350 between host computer 3310 and UE 3330, in response to variations in the measurement results. The measurement procedure and/or the network functionality for reconfiguring OTT connection 3350 may be implemented in software 3311 and hardware 3315 of host computer 3310 or in software 3331 and hardware 3335 of UE 3330, or both. In embodiments, sensors (not shown) may be deployed in or in association with communication devices through which OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of OTT connection 3350 may include message format, retransmission settings, preferred routing etc.; the reconfiguring need not affect base station 3320, and it may be unknown or imperceptible to base station 3320. Such procedures and functionalities may be known and practiced in the art. In certain embodiments, measurements may involve proprietary UE signaling facilitating host computer 3310's measurements of throughput, propagation times, latency and the like. The measurements may be implemented in that software 3311 and 3331 causes messages to be transmitted, in particular empty or 'dummy' messages, using OTT connection 3350 while it monitors propagation times, errors etc.

Figure 11:
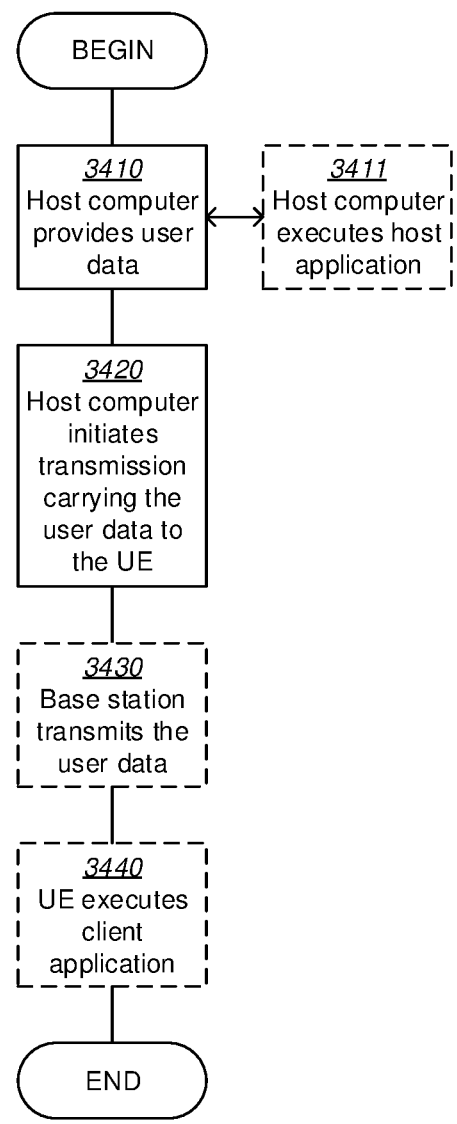
FIG. 11 is a flowchart illustrating a method implemented in a communication system in accordance with some embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step 3410, the host computer provides user data. In substep 3411 (which may be optional) of step 3410, the host computer provides the user data by executing a host application. In step 3420, the host computer initiates a transmission carrying the user data to the UE. In step 3430 (which may be optional), the base station transmits to the UE the user data which was carried in the transmission that the host computer initiated, in accordance with the teachings of the embodiments described throughout this disclosure. In step 3440 (which may also be optional), the UE executes a client application associated with the host application executed by the host computer.

Figure 12:
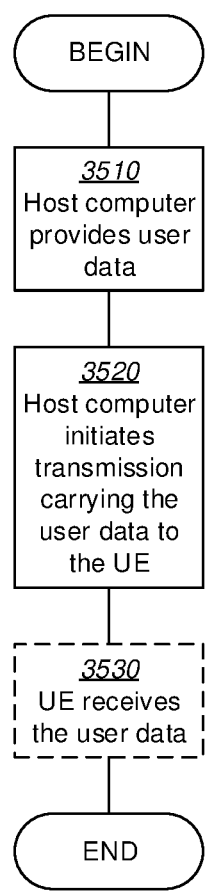
FIG. 12 is a flowchart illustrating a method implemented in a communication system in accordance with some embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step 3510 of the method, the host computer provides user data. In an optional substep (not shown) the host computer provides the user data by executing a host application. In step 3520, the host computer initiates a transmission carrying the user data to the UE. The transmission may pass via the base station, in accordance with the teachings of the embodiments described throughout this disclosure. In step 3530 (which may be optional), the UE receives the user data carried in the transmission.

Figure 13:
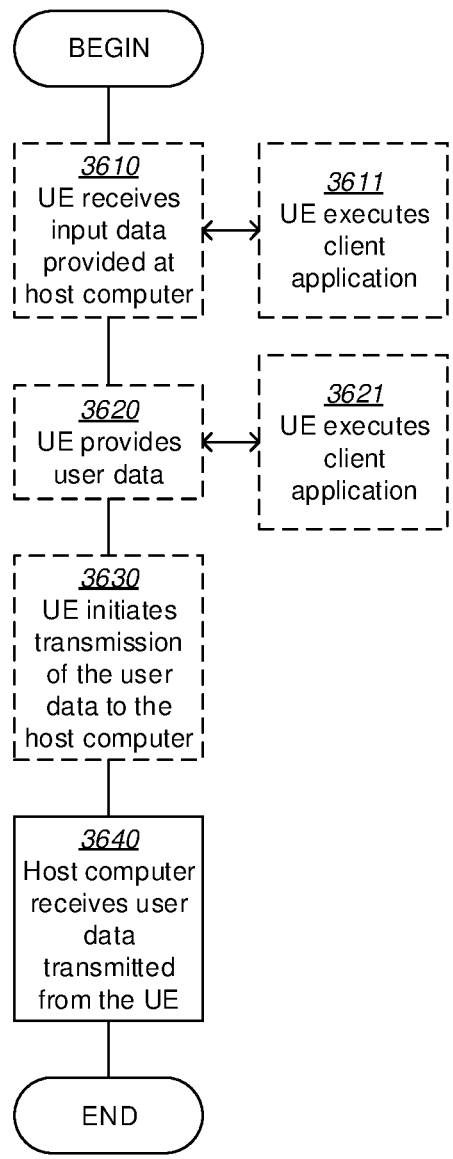
FIG. 13 is a flowchart illustrating a method implemented in a communication system in accordance with some embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 3610 (which may be optional), the UE receives input data provided by the host computer. Additionally or alternatively, in step 3620, the UE provides user data. In substep 3621 (which may be optional) of step 3620, the UE provides the user data by executing a client application. In substep 3611 (which may be optional) of step 3610, the UE executes a client application which provides the user data in reaction to the received input data provided by the host computer. In providing the user data, the executed client application may further consider user input received from the user. Regardless of the specific manner in which the user data was provided, the UE initiates, in substep 3630 (which may be optional), transmission of the user data to the host computer. In step 3640 of the method, the host computer receives the user data transmitted from the UE, in accordance with the teachings of the embodiments described throughout this disclosure.

Figure 14:
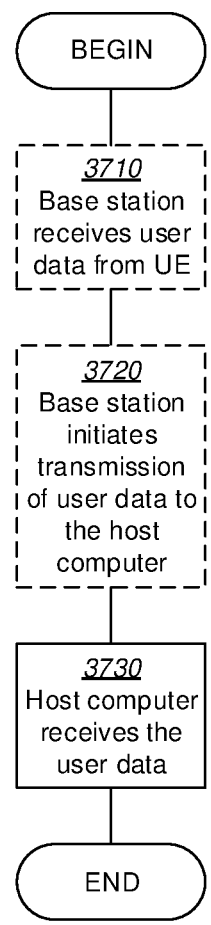
FIG. 14 is a flowchart illustrating a method implemented in a communication system in accordance with some embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step 3710 (which may be optional), in accordance with the teachings of the embodiments described throughout this disclosure, the base station receives user data from the UE. In step 3720 (which may be optional), the base station initiates transmission of the received user data to the host computer. In step 3730 (which may be optional), the host computer receives the user data carried in the transmission initiated by the base station.

In an aspect of the disclosure, there is provided a method implemented in a communication system including a host computer, a base station and a terminal device. The method comprises, at the host computer, providing user data. The method further comprises, at the host computer, initiating a transmission carrying the user data to the terminal device via a cellular network comprising the base station. The base station determines a number of PRBs consumed by a code block. The base station allocates a first set of PRBs for a transmission for a terminal device, based on channel qualities of a second set of PRBs which have a quantity equaling to the determined number and have the worst channel qualities among the first set of PRBs.

In an embodiment of the disclosure, the method may further comprise, at the base station, transmitting the user data.

In an embodiment of the disclosure, the user data may be provided at the host computer by executing a host application. The method may further comprise, at the terminal device, executing a client application associated with the host application.

In another aspect of the disclosure, there is provided a communication system including a host computer comprising processing circuitry configured to provide user data and a communication interface configured to forward the user data to a cellular network for transmission to a terminal device. The cellular network comprises a base station having a radio interface and processing circuitry. The base station's processing circuitry is configured to determine a number of PRBs consumed by a code block. The base station's processing circuitry is further configured to allocate a first set of PRBs for a transmission for a terminal device, based on channel qualities of a second set of PRBs which have a quantity equaling to the determined number and have the worst channel qualities among the first set of PRBs.

In an embodiment of the disclosure, the communication system may further include the base station.

In an embodiment of the disclosure, the communication system may further include the terminal device. The terminal device may be configured to communicate with the base station.

In an embodiment of the disclosure, the processing circuitry of the host computer may be configured to execute a host application, thereby providing the user data. The terminal device may comprise processing circuitry configured to execute a client application associated with the host application.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one skilled in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a base station, the method comprising:
   determining a number K of physical resource blocks (PRBs) consumed per code block, with respect to a transport block segmented into code blocks for transmission to or from a terminal device; and
   allocating a subset of PRBs for transmission of the transport block, from an available set of PRBs, based on:
      sorting the available set of PRBs from highest channel quality to lowest channel quality, to obtain a sorted set of available PRBs;
      evaluating successive allocations of PRBs from the sorted set of available PRBs until finding a successive allocation that has a total capacity that fulfills a required capacity for the transport block and choosing that successive allocation as the allocated subset, or if no successive allocation fulfills the required capacity, choosing as the allocated subset the smallest successive allocation associated with a maximum total capacity observed for the successive allocations that were evaluated; and
      with respect to each successive allocation evaluated, calculating the total capacity of the successive allocation by determining an average capacity of the K worst PRBs contained in the successive allocation in terms of channel quality, and setting the per-PRB capacity of all PRBs in the successive allocation to that average capacity.

2. The method according to claim 1, further comprising determining the number K of PRBs consumed per code block as a size of one code block divided by an average throughput of the terminal device per PRB per symbol.

3. The method according to claim 2, wherein the average throughput of the terminal device per PRB per symbol is derived from previous transmission for the terminal device.

4. The method according to claim 1, wherein the transmission for the terminal device is a downlink transmission to the terminal device or an uplink transmission from the terminal device.

5. The method according to claim 1, wherein the channel quality is represented by signal to interference plus noise ratio (SINR).

6. A base station comprising:
   at least one processor; and
   at least one memory, the at least one memory containing instructions executable by the at least one processor, whereby the base station is configured to:
      determine a number K of physical resource blocks (PRBs) consumed per code block, with respect to a transport block segmented into code blocks for transmission to or from a terminal device; and
      allocate a subset of PRBs for transmission of the transport block, from among an available set of PRBs, based on:
         sorting the available set of PRBs from highest channel quality to lowest channel quality, to obtain a sorted set of available PRBs;
         evaluating successive allocations of PRBs from the sorted set of available PRBs until finding a successive allocation that has a total capacity that fulfills a required capacity for the transport block and choosing that successive allocation as the allocated subset, or if no successive allocation fulfills the required capacity, choosing as the allocated subset the smallest successive allocation associated with a maximum total capacity observed for the successive allocations that were evaluated; and
         with respect to each successive allocation that is evaluated, calculating the total capacity of the successive allocation by determining an average capacity of the K worst PRBs contained in the successive allocation in terms of channel quality, and setting the per-PRB capacity of all PRBs in the successive allocation to that average capacity.

7. The base station according to claim 6, wherein the base station is configured to determine the number K of PRBs consumed per code block as a size of one code block divided by an average throughput of the terminal device per PRB per symbol.

8. The base station according to claim 7, wherein the average throughput of the terminal device per PRB per symbol is derived from previous transmission for the terminal device.

9. The base station according to claim 6, wherein the transmission for the terminal device is a downlink transmission to the terminal device or an uplink transmission from the terminal device.

10. The base station according to claim 6, wherein the channel quality is represented by signal to interference plus noise ratio (SINR).

* * * * *